United States Patent
Mattssön et al.

(10) Patent No.: US 6,170,883 B1
(45) Date of Patent: Jan. 9, 2001

(54) TUBULAR ELEMENT WITH SEALING MEANS AND A METHOD FOR MANUFACTURING THE TUBULAR ELEMENT

(75) Inventors: Lars-Åke Mattssön, Båstad; Pontus Andersson, Angelholm; Kenneth Lennartsson, Torekov; Tomas Persson, Munka Ljungby, all of (SE)

(73) Assignee: Lindab AB, Bastad (SE)

( * ) Notice: Under 35 U.S.C. 154(b), the term of this patent shall be extended for 0 days.

(21) Appl. No.: 09/433,234

(22) Filed: Nov. 4, 1999

(30) Foreign Application Priority Data

Nov. 6, 1998 (EP) ................................................. 98850172

(51) Int. Cl.⁷ ..................................................... F16L 17/06
(52) U.S. Cl. ........................... 285/110; 285/370; 285/379
(58) Field of Search ..................................... 285/370, 371, 285/110, 109, 379; 277/609, 611, 615, 616

(56) References Cited

U.S. PATENT DOCUMENTS

| | | |
|---|---|---|
| 3,015,510 | 1/1962 | Bates . |
| 3,955,834 | 5/1976 | Ahlrot . |
| 4,050,703 | 9/1977 | Tuvesson et al. . |
| 4,193,246 | 3/1980 | Irmer . |
| 4,216,981 * | 8/1980 | Jensen ................................. 285/370 |
| 4,369,159 | 1/1983 | Irmer . |
| 4,664,421 | 5/1987 | Jones . |
| 5,407,122 * | 4/1995 | Stefansson et al. .................. 285/379 |
| 5,531,460 * | 7/1996 | Stefansson et al. .................. 285/379 |

FOREIGN PATENT DOCUMENTS

| | | |
|---|---|---|
| 2840962 * | 4/1979 | (DE) .................................... 285/370 |
| 150025 | 11/1986 | (DK) . |
| 092881 A2 | 11/1983 | (EP) . |
| 0 273 221 B1 | 7/1988 | (EP) . |
| 0389462 A1 | 9/1990 | (EP) . |
| 07568066 B1 | 2/1997 | (EP) . |
| 2015241 | 4/1970 | (FR) . |
| 1285018 | 3/1998 | (IT) . |
| 174861 | 4/1995 | (NO) . |
| 7415594-6 | 2/1976 | (SE) . |
| WO 94/15133 | 7/1994 | (WO) . |

OTHER PUBLICATIONS

"Sistema Di Tenuta Ring", issued by Climovent System, an Italian Company.

"Veloduct" catalog 1997, ABB Ventilation Products AB, Division Veloduct.

* cited by examiner

Primary Examiner—Lynne H. Browne
Assistant Examiner—Aaron Dunwoody
(74) Attorney, Agent, or Firm—Weingarten, Schurgin, Gagnebin & Hayes LLP

(57) ABSTRACT

A tubular element has a sealing ring mounted at an end of the tubular element. The sealing ring has a base clamped against the outer surface of the tubular element. Further, the sealing ring has a sealing lip adapted to seal against an inner surface of an outer tube, in which the tubular element is inserted. The base is disposed in a groove that is formed in the wall of the tubular element. The sealing ring has a further lip that is positioned adjacent to the end of the tubular element and that is bent down and clamped against the base by means of the end portion, thereby providing secure fastening of the sealing ring. The sealing ring is fastened by a method involving bending of the end portion of the tubular element together with the further lip.

41 Claims, 4 Drawing Sheets

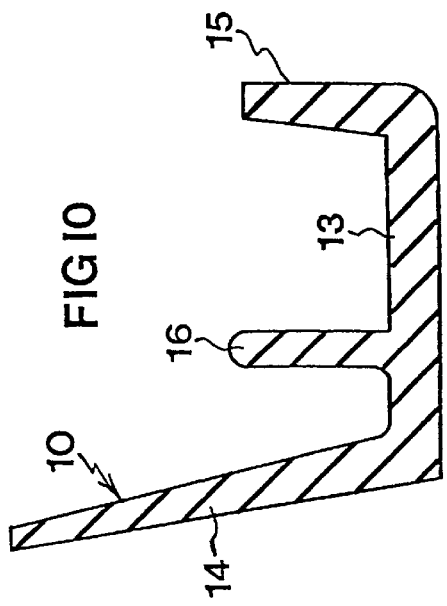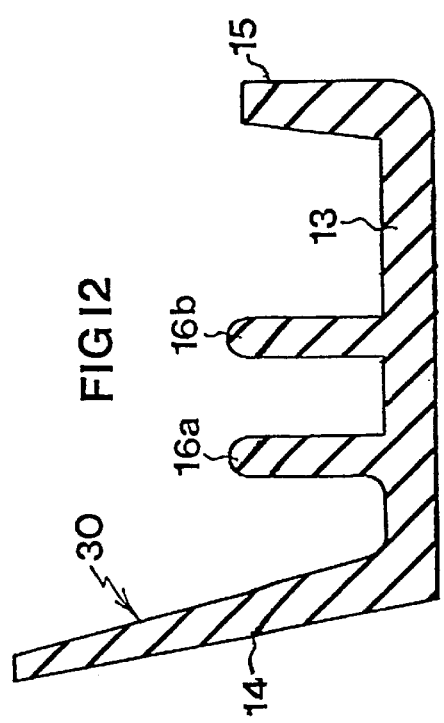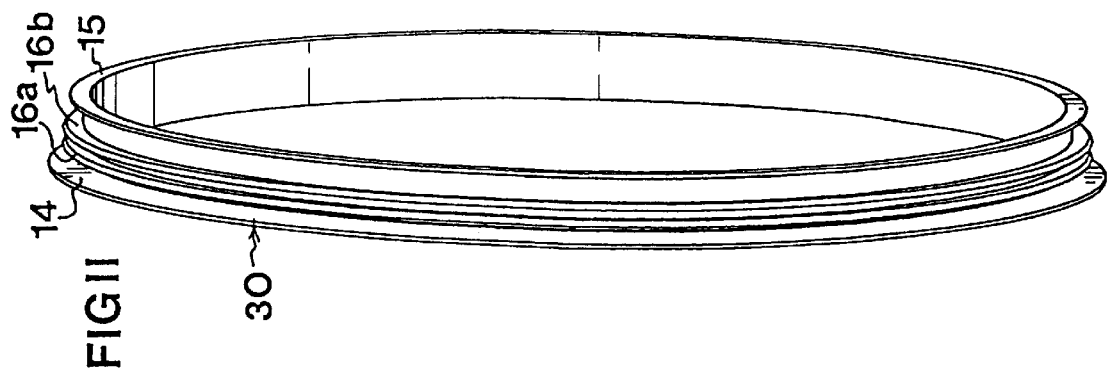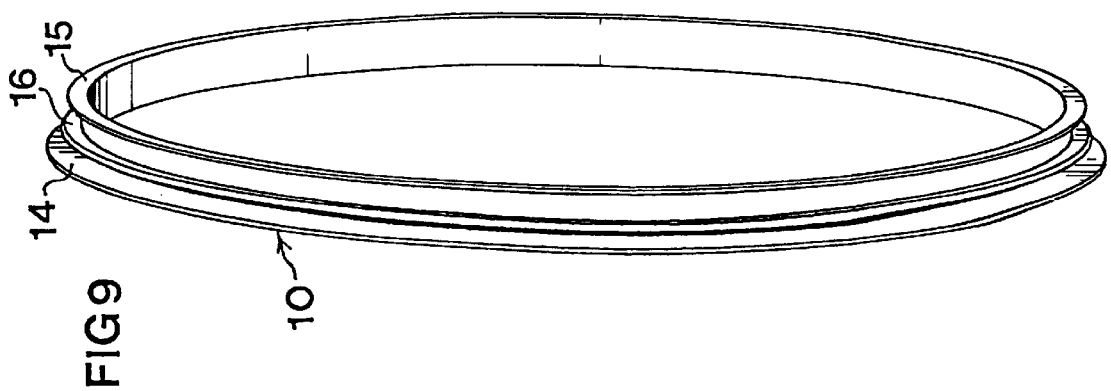

TUBULAR ELEMENT WITH SEALING MEANS AND A METHOD FOR MANUFACTURING THE TUBULAR ELEMENT

TECHNICAL FIELD

The present invention relates to a tubular element for use in a fluid-conducting duct system, in particular a ventilation duct system, and a method for manufacturing the tubular element.

BACKGROUND ART

When connecting fluid-conducting duct elements, especially in ventilation duct systems, it is important that the joints between the tubular elements be sufficiently sealed. U.S. Pat. No. 3,955,834 disclosed various modes of providing sealing means in the joint between a tube connector inserted in and interconnecting two tubes. FIGS. 3–9 and of this U.S. patent of 1976 show how an external, circumferential, flexible sealing ring having L-shaped cross-section is mounted at the end of a tubular element. The sealing ring is placed with its base abutting the outer surface of the tubular element, whereupon the free end portion of the tubular element is bent rearwardly outwards and turned back towards the wall of the tubular element. The sealing ring has a sealing lip radially extending away from the base and adapted to seal against an inner surface of an outer tube, in which the tubular element is inserted (see FIG. 8).

This basic method of mounting the sealing ring at the end of a tubular element is still used in practice, as is shown in the Swedish-language catalogue "Veloduct®, Cirkulärt kanalsystem" issued in 1997 by ABB Ventilation Products AB, Division Veloduct. On page 2 of this catalogue, there is shown how a sealing ring with L-shaped cross-section is fastened by the bonding and clamping operation described above. This known technique, which is schematically shown in FIG. 1 of the appended drawings, has however several disadvantages which will be related below.

The base of the L-shaped sealing ring is placed on an annular, circumferential step which protrudes radially outwards. This step leads to various drawbacks related to the mounting of the sealing ring as well as the structure of the sealing ring and its manufacture. When mounting the sealing ring on the tubular body, it is difficult to put the base on the raised step. Normally, this is a manual operation and the person mounting the ring often has to adjust the sealing ring on the raised step before the bending operation. Due to the raised step, the sealing ring has a tendency to slide inwardly on the tubular body during the bending of the end portion of the tubular body. This sliding movement may jeopardize the bending and clamping operation and thereby prevent safe fastening of the sealing ring. The bulge on the front end of the sealing ring base is normally not enough to prevent this sliding, especially in cases where the sealing ring material is relatively soft.

In practice, it has also been found that this known L-shaped sealing ring has special drawbacks for tubes of a large diameter, say exceeding about 300 mm. For tubular elements of such a large diameter, the radial dimension of the sealing lip is larger than the axial dimension of the base. Such sealing rings have a tendency to "tilt" about 90°, which means that the sealing ring is abutting the wall of the tubular body whereas the sealing ring base is directed radially outwards from the tubular wall. This misplacement has to be corrected manually in mounting.

The bulge at the free end of the sealing ring base makes it difficult to produce the sealing ring which consists of rubber. Due to the bulge, special tooling has to be used which involve specific drawbacks. The bulge makes it hard to achieve proper release from the mould. Especially when the sealing ring is injection moulded, the bulge is disadvantageous.

Thus, there is a need for a tubular element having improved sealing means, as well as a new method for manufacturing such a tubular element.

SUMMARY OF THE INVENTION

An object of the present invention is to eliminate the disadvantages mentioned above and to provide a tubular element with improved sealing means.

A further object of the invention is to provide a method of manufacturing such an improved tubular element.

A specific object of the invention is to provide an improved technique for reliable fastening of the sealing means on the tubular body.

These and other objects, which will appear from the following, have now been achieved by a tubular element for use in a fluid-conducting duct system, in particular a ventilation duct system, comprising an external, circumferential, flexible sealing ring mounted at an end of the tubular element, the sealing ring having a base which is clamped against the outer surface of the tubular element by means of the free end portion of the tubular element, which is bent radially outwards and turned back towards the wall of the tubular element, the sealing ring further having a sealing lip extending substantially radially away from said base and adapted to seal against an inner surface of an outer tube, in which the tubular element is inserted, the base of the sealing ring being disposed in a circumferential groove, which is formed in the wall of the tubular element and which has an axial width matching the axial width of said base, the sealing ring having a further lip or projection which is positioned adjacent to the end of the tube element and which is axially spaced from the sealing lip, said further lip extending substantially radially away from said base before said bending of the end portion of the tubular element, and said further lip being bent down and clamped against said base by means of said end portion by said bending.

The objects have also been achieved by a method of manufacturing a tubular element for use in a fluid-conducting duct system, in particular a ventilation duct system; in which an external, circumferential, flexible sealing ring is applied to the outer surface of a tubular body, said sealing ring having a base and a sealing lip extending substantially radially away therefrom; and in which the sealing ring is fastened to the tubular body by bending the free end portion of the tubular body radially outwards and backwards towards the wall of the tubular body, thereby clamping the base of the sealing ring between said bent end portion and said outer surface of the tubular body, the method comprising the steps that a circumferential groove is formed in the wall of the tubular body, said end portion of the tubular body being first bent to form a radially extending flange; that the sealing ring is placed in said groove which matches the sealing ring base, the sealing ring having a further lip which extends substantially radially from said base and which in this position extends adjacent to and substantially in parallel with the radial flange; and that the flange is then bent further back towards the wall of the tubular body so that the further lip is bent down together with the flange and clamped against the sealing ring base.

Since the sealing ring of the invention is disposed in a groove, it is far more easy to fix the same before the fastening operation compared to the known sealing ring placed on a raised step. Should the sealing ring of the invention for some reason be placed inaccurately before the bending operation, that is partially outside the groove, this is easily remedied. The misplaced sealing ring is only to be somewhat rotated, whereby the sealing ring base automatically finds its way into the groove.

The sealing ring base is disposed in the groove between defined shoulders of the same, which means that the sealing ring is safely kept in place during the fastening operation.

Thanks to the placement of the sealing ring base in the groove as well as the presence of the further lip, the improved sealing ring has no tendency to "tilt" as has been the case with known sealing rings. The design of the further lip as well as its connection to the sealing ring base further promote this advantage.

Since the further lip is bent down and firmly clamped against the sealing rig base by means of the end portion of the tubular element, a very reliable fastening of the sealing ring is achieved.

The base of the new sealing ring has no bulge, which makes the ring easier to manufacture than the known sealing ring discussed above.

In a preferred embodiment, the bent end portion of the tubular element and the bottom of the groove define an annular, circumferential space filled with the further lip and a portion of the sealing ring base. These features makes the clamping of the sealing ring base so strong that it is almost impossible to remove the sealing ring from the bent portion by manual power.

Preferably, said space has a radial width which decrease axially inwards from the end of the tubular element. This feature further enhances the reliable fastening of the sealing ring.

It is preferred that the sealing ring has a substantially U-shaped cross-section, the flanges of which form the sealing lip and the further lip, respectively. This design of the sealing ring enhances the stiffness of the same, which in turn contributes to secure fastening of the sealing ring in the groove.

In a further preferred embodiment, the sealing ring has at least one intermediate sealing lip which is disposed between the sealing lip and the further lip and which is intended to provide an additional sealing against the inner surface of the outer tube, into which the tubular element is inserted.

Corresponding advantages are achieved by the method of the invention compared to the known methods discussed by way of introduction. The mode of manufacturing a tubular element having an improved sealing means can be reduced into practice by means of inexpensive positioning and folding equipment which makes it possible to automate the fastening operations.

BRIEF DESCRIPTION OF THE DRAWINGS

The invention and its many advantage will now be further described, reference being made to the accompanying schematic drawings showing some presently preferred, exemplifying embodiments.

FIG. 9 shows the sealing ring of the first embodiment separately and in perspective.

FIG. 10 shows, on a larger scale, a cross-section of the sealing ring of FIG. 9.

FIG. 11 shows separately and in perspective a sealing ring according to a second embodiment of the invention.

FIG. 12 shows, on a larger scale, a cross-section of the sealing ring of FIG. 11.

DESCRIPTION OF PREFERRED EMBODIMENTS

Figure 1:
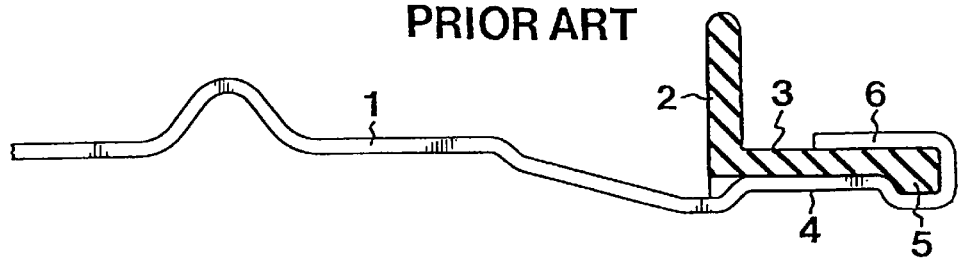
FIG. 1 is a partial cross-section of a wall of a tubular element having a prior-art sealing ring.
Figure 2:
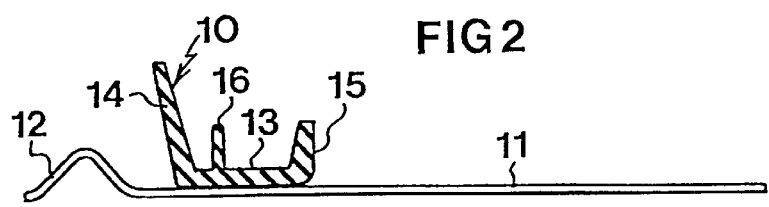
FIGS. 2–5 illustrate, in cross-sections corresponding to FIG. 1, the mounting of a sealing ring on a tubular element according to a first embodiment of the invention.

FIG. 1 shows a wall portion 1 of a tubular element and a known L-shaped sealing ring having a radial sealing lip 2 and a base 3. The wall portion 1 has a raised step 4 on which the base 3 is placed. The base 3 has at its free end a bulge 5, around which an end portion 6 of the wall 1 is bent in a manner known per se. This sealing means 2, 3 has the drawbacks mentioned above.

FIGS. 2–5 show how a sealing ring generally designated 10 is mounted on a tubular element 11 having a radial, circumferential bead 12. The sealing ring 10 of this first embodiment has a beam 13 and three lips 14–16 radially extending outwardly away from the base 13. The inner lip is a sealing lip 14 adapted to seal against an inner surface of an outer tube, in which the tubular element 11 is inserted (see FIG. 6). The outer projection or lip 15 is lower than the sealing lip 14 and takes part in the fastening of the sealing ring 10 as will be described below. The intermediate sealing lip 16 provides for additional sealing against the inner surface of the outer tube (FIG. 6).

Figure 3:
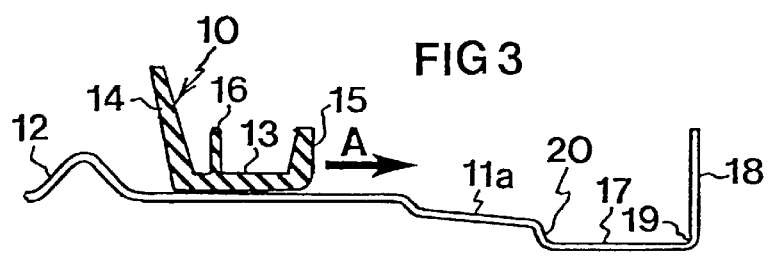
Figure 4:
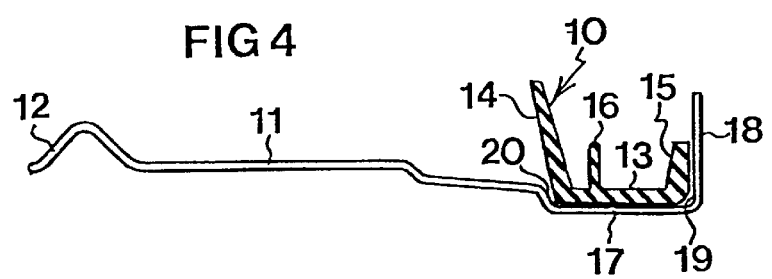

In manufacturing the tubular element 11 with improved sealing means, a circumferential groove 17 is formed in the wall of the tubular element 11 (FIG. 3). A free end portion of the tubular element 11 is bent to form a radially extending flange 18 which defines a shoulder 19 which together with an opposite, spaced shoulder 20, forms the groove 17.

In a following step, the sealing ring 10 is axially displaced along the outside of the tubular element 11 (arrow A) from its initial position (FIG. 2) and placed in the groove 17. The axial displacement of the sealing ring 10 is promoted by an inclined portion 11a of the wall of the tubular element 11, and the sealing ring base 13 is securely set in the groove 17. The wall portion 11a is inclined towards the groove 17. The axial width of the groove 17 matches the axial width of the sealing ring base 13.

The opposite shoulders 19, 20 of the groove 17 axially abut the transitions between the sealing ring base 13 and the sealing lip 14 and the further lip 15, respectively. The sealing ring base 13 has no bulge as has the prior-art sealing ring shown in FIG. 1, but has a planar surface in abutment with the planar bottom of the groove 17. In this position (FIG. 4), the further lip 15 extends adjacent to and substantially in parallel with the flange 18.

Figure 5:
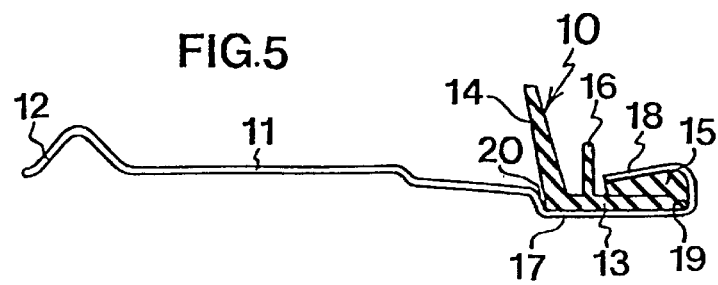
Figure 6:
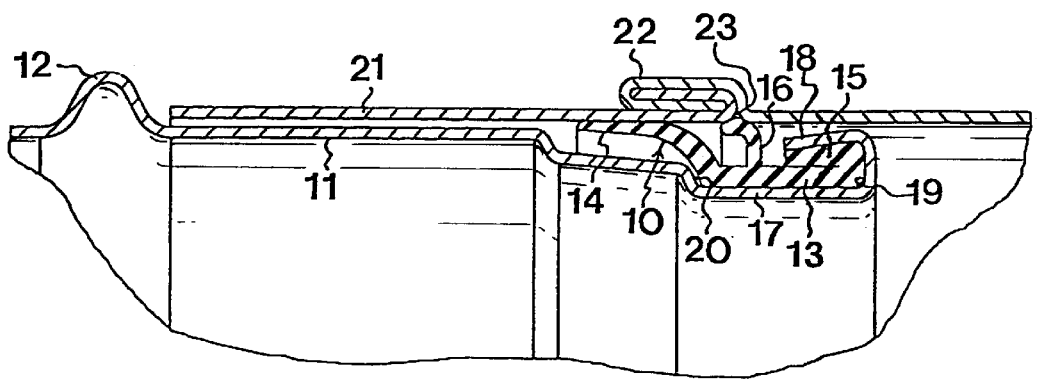
FIG. 6 shows, on a larger scale, a partial section of a tubular element provided with improved sealing means of the invention and inserted in an outer tube.

In a final step, the flange 18 is bent further back towards the wall of the tubular element 11 so that the further lip 15 is bent down together with the flange 18 and clamped against the sealing ring base 13 (FIG. 5). The radial height of the further lip 15 is calculated in such a way that the free end of the same is approximately radially flush with the free end of the bent flange 18 in the clamped position. The further lip 15 must not interfere with the intermediate lip 16 in the clamped position. Further, the bent flange 18 preferably extends over approximately half of the axial width of the groove 17 in the clamped position. This structure results in a very secure mounting of the sealing ring 10 at the end of the tubular element 11.

The second of FIG. 6 shows how the sealing lip 14 seals against the inside of an outer tube 21, in which the tubular element 11 is inserted and the free end of which is stopped by the bead 12. The outer tube 21 is a so-called helically wound lock-seam tube having a helical lock seam 22. Such tubes are commonly used in ventilation duct systems.

Due to the helical lock seam 22, there is a small helical groove 23 on the inside of the outer tube 21. The intermediate sealing lip 16 seals against the inside of the outer tube 21 and is particularly adapted to seal the helical groove 23, which in certain cases may cause leakage if not sealed. Indeed, the main sealing function is of course provided by the larger sealing lip 14.

As is clearly seen in FIG. 6, and also in FIG. 5, the bent flange 18 and the bottom of the groove 17 define an annular, circumferential space filled with the further lip 15 clamped on a portion of the sealing ring base 13. This firm clamping of the further lip 15 guarantees reliable fastening of the sealing ring 10. Preferably, as can be seen in FIGS. 5 and 6, the space between the flange 18 and the bottom of the groove 17 has a radial width which decreases axially inwards from the end of the tubular element 11. In other words, the space as a frustoconical shape with its smallest radial width approximately in the middle of the groove 17 and its largest radial width adjacent to the end of the tubular element 11.

Figure 7:
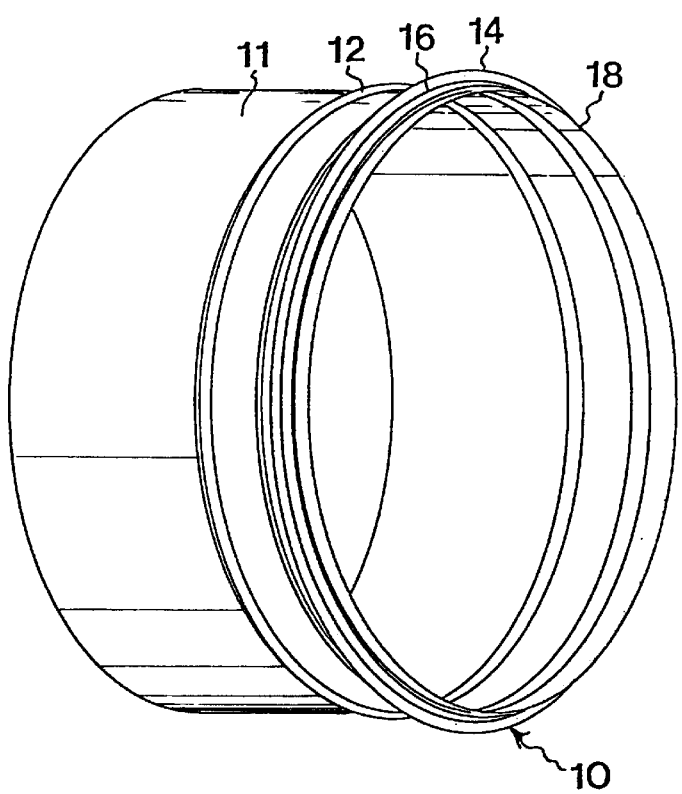
FIGS. 7–8 show a tubular element with a sealing ring according to the first embodiment of the invention.
Figure 8:
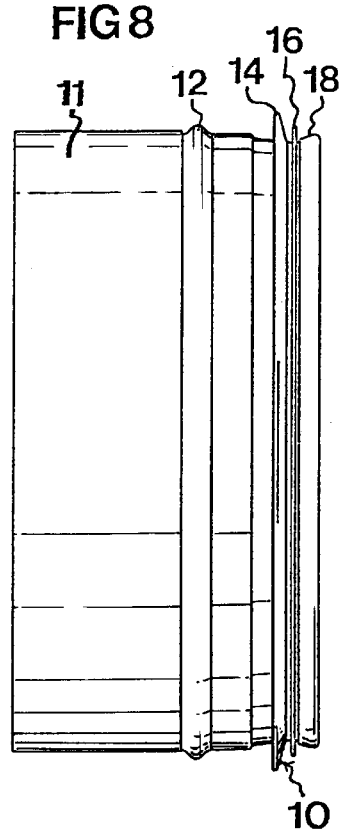
Figure 13:
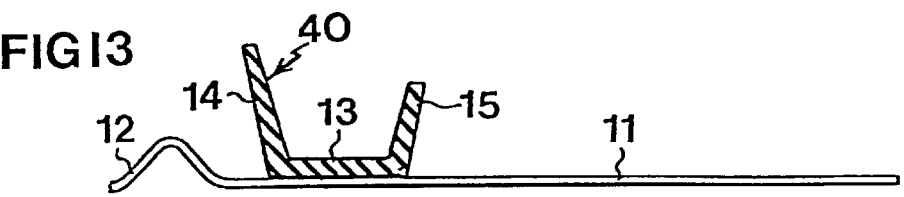
FIGS. 13–16 illustrate, in cross-sections corresponding to FIGS. 2–5, the mounting of a sealing ring according to a third embodiment of the invention.
Figure 14:
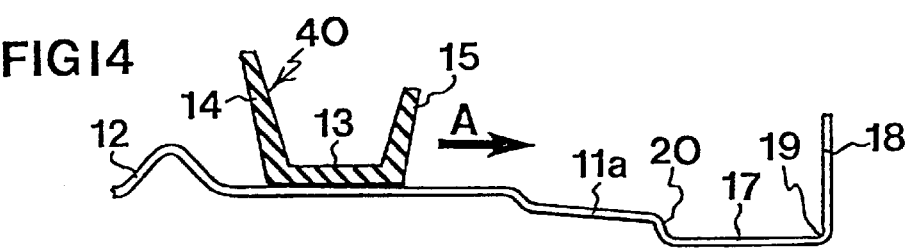
Figure 15:
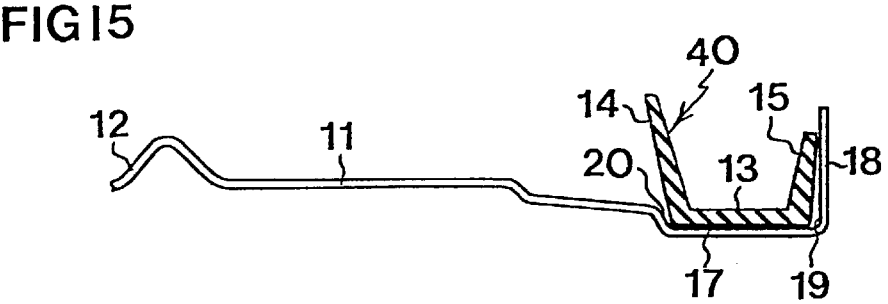

FIGS. 7–8 show the tubular element 11 with the sealing means 10 in accordance with the first embodiment of the invention.

FIG. 9 shows the sealing ring 10 separately, and the details of the sealing ring 10 can be seen in the cross-section of FIG. 10.

FIG. 11 shows in a view corresponding to FIG. 9 a sealing ring generally designated 30. In accordance with this second embodiment of the invention, the sealing ring 30 has two intermediate lips 16a and 16b (FIG. 12) which extend radially away from the sealing ring base 13 and which both are intended to seal against the inside of the outer tube 21 (cf. FIG. 6). The two intermediate lips 16a, 16b are parallel and mainly intended to seal the helical groove 23 on the inside of the outer tube 21. The sealing lip 14 and the further lip 15 of the sealing ring 30 are of the same design as the corresponding lips of the sealing ring 10 in the first embodiment. To provide room for the two parallel intermediate lips 16a, 16b, however, the axial dimension of the sealing ring base 13 of the modified sealing ring 30 is somewhat greater than that of the sealing ring base 13 in the first embodiment.

Figure 16:
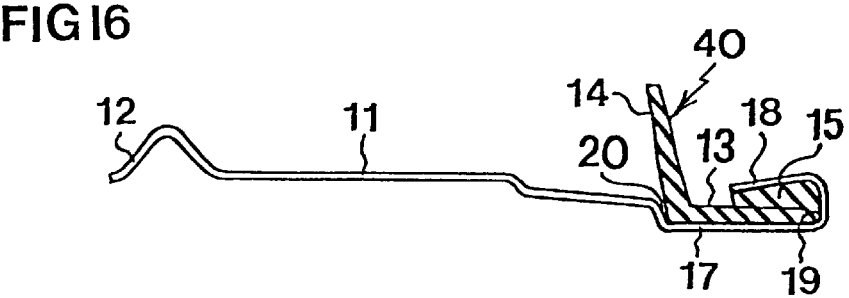

In FIGS. 13–16 which basically correspond to FIGS. 2–5, still another modified sealing ring 40 is shown, as well as its fastening on the tubular element 11. The sealing ring 40 in accordance with this third embodiment is a so-called double-lip sealing ring with no intermediate lip. Since the sealing ring 40 has no intermediate lip, the flange 18 can be bent in such a way that it extends over somewhat more than half of the groove 17 as is shown in FIG. 16. This enhances the clamping effect.

All sealing rings 10, 30, 40 described herein have shown excellent results in practical tests. The drawbacks encountered when using prior-art techniques for fastening sealing rings, for instance an L-shaped sealing ring as shown in FIG. 1, are eliminated by the present invention. In these tests, certain features have been noticed. For instance, it has been found that the design of the transition between the sealing ring base 13 and the further lip 15 is of interest. This transition should define a corner portion by means of which the further lip 15 achieves a certain radial stiffness adjacent to the transition. This design guarantees that the sealing ring 10, 30, 40 is safely maintained in the groove 17 during the fastening operation as shown in FIGS. 2–5 and FIGS. 13–16, respectively. Correspondingly, it has been found that the transition between the sealing ring base 13 and the sealing lip 14 preferably defines a corner portion, by means of which the sealing lip 14 has a certain radial stiffness adjacent to the transition.

The tests have also produced good results when the further lip 15 has a thickness greater than that of the sealing lip 14. As to proper stiffness and sealing effect, it has also been observed that the thickness of the sealing lip 14 and the further lip 15, respectively, should decrease radially away from the sealing ring base 13. Since the sealing lip 14 and the further lip 15, respectively, are relatively thick adjacent to the base 13, the stiffness of the sealing ring 10, 30, 40 is promoted. Further, it is preferred that the two lips 14, 15 diverge radially away from the sealing ring base 13, which in particular makes the sealing ring 10, 30, 40 easy to produce.

Preferably, the sealing ring 10, 30, 40 is substantially U-shaped in cross-section, the flanges of which form the sealing lip 14 and the further lip 15, respectively, and the web of which forms the base 13. The U-shaped design of the sealing ring 10, 30, 40 with its main lips 14 and 15 enhances the stiffness of the sealing ring 30 and thereby promotes secure fixing of the ring 30 in the groove 17. The base 13 of the U-shaped sealing ring 10, 30, 40 has no bulge, but is planar which makes the ring easier to manufacture than the known sealing ring shown in FIG. 1.

As to the radial height of the lips 14–16, it has been found advantageous that the further lip 15 is lower than the sealing lip 14 with respect to the sealing ring base 13. In certain applications, however, the lips 14 and 15 may also have substantially the same radial height. Further, it is preferred that the intermediate lip 16 or the intermediate lips 16a, 16b be lower than the sealing lip 14 with respect to the sealing ring base 13. In order to seal the helical groove 23 of the outer tube 21, the intermediate sealing lip(s) 16, 16a, 16b should preferably have a thickness which is less than that of the sealing ring 14. Alternatively, the thickness of the intermediate lips 16, 16a, 16b may also be substantially the same as that of the sealing lip 14, or in certain cases also somewhat thicker (not shown). Preferably, the intermediate lip(s) 16, 16a, 16b should also have a radial height with respect to the sealing ring base 13 that is substantially the same as the radial height of the further lip 15.

The sealing lip 14 is shown somewhat inclined away from the base 13, but alternatively the lip 14 may also be orthogonal to the base 13 or even somewhat inclined inwards with respect to the base (not shown). The further lip 15 may also be orthogonal as an alternative (not shown).

The sealing ring 10, 30, 40 consists of a flexible polymer material, for instance EPDM rubber. The tubular element 11 is for instance of sheet metal, as is the outer tube 21.

Finally, it should be emphasized that the invention is by no means restricted to the embodiments described above, and modifications are feasible within the scope of the invention defined by the appended claims. In particular, it should be mentioned that the number of lips of the sealing ring is not crucial and that the tubular element of the invention may be used in various applications, although ventilation duct systems are the main field of the invention. The tubular element may for instance be a connector, a bend, a T-piece or any other fitting used in a ventilation duct system.

What is claimed is:

1. A tubular element for use in a fluid-conducting duct system, in particular a ventilation duct system, comprising an external, circumferential, flexible sealing ring mounted at an end of the tubular element, the tubular element having a wall defining an outer surface, a circumferential groove formed in the outer surface of the wall, and a free end portion disposed at an end of the wall, the sealing ring comprising:

a base which is clamped against the outer surface of the tubular element by means of the free end portion of the tubular element, which is bent radially outwards and turned back towards the outer surface of the tubular element, a sealing lip extending substantially radially away from said base and adapted to seal against an inner surface of an outer tube, in which the tubular element is inserted, the base of the sealing ring being disposed in the circumferential groove that is formed in the wall of the tubular element and which has an axial width matching the axial width of said base, and a further lip or projection which is positioned adjacent to the end of the tubular element and which is axially spaced from the main sealing lip, said further lip extending substantially radially away from said base before said bending of the end portion of the tubular element, and said further lip being bent down and clamped against said base by means of said free end portion by said bending.

2. The tubular element of claim 1, wherein said bent end portion and the bottom of the groove define an annular, circumferential space filled with said further lip and a portion of the sealing ring base.

3. The tubular element of claim 2, wherein said space has a radial width decreasing axially inwards from the end of the tubular element.

4. The tubular element of claim 1, wherein said groove is defined by axially spaced shoulders which axially abut the transitions between the sealing ring base and the further lip and the sealing lip, respectively.

5. The tubular element of claim 1, wherein the bent end portion of the tubular element in the clamped position extends over approximately half of the axial width of the groove.

6. The tubular element of claim 1, wherein the further lip is radially lower than the sealing lip with respect to the sealing ring base before said clamping.

7. The tubular element of claim 1, wherein the transition between the sealing ring base and the further lip defines a corner portion by means of which the further lip has a certain radial stiffness adjacent to said transition.

8. The tubular element of claim 1, wherein the transition between the sealing ring base and the sealing lip defines a corner portion by means of which the sealing lip has a certain radial stiffness adjacent to said transition.

9. The tubular element of claim 1, wherein the further lip has a thickness greater than that of the sealing lip.

10. The tubular element of claim 1, wherein the thickness of the further lip is decreasing radially away from the sealing ring base.

11. The tubular element of claim 1, wherein the thickness of the sealing lip is decreasing radially away from the sealing ring base.

12. The tubular element of claim 1, wherein the sealing lip and the further lip diverge radially away from the sealing ring base before said clamping.

13. The tubular element of claim 1, wherein the surface of the sealing ring base that is disposed in said groove is planar, the groove having a corresponding planar bottom.

14. The tubular element of claim 1, wherein the sealing ring is substantially U-shaped in cross-section before said clamping, the flanges of which form the sealing lip and the further lip, respectively.

15. The tubular element of claim 1, wherein the sealing ring has at least one intermediate sealing lip, which is disposed between said sealing lip and said further lip and which extends radially away from the sealing ring base, said intermediate sealing lip being adapted to seal against the inner surface of said outer tube.

16. The tubular element of claim 15, wherein the intermediate sealing lip is radially lower than said sealing lip with respect to the sealing ring base.

17. The tubular element of claim 15, wherein the intermediate sealing lip has a thickness which is less than that of said sealing lip.

18. The tubular element of claim 15, wherein the sealing ring has two intermediate sealing lips which are parallel and which have substantially the same radial height with respect to the sealing ring base.

19. The tubular element of claim 15, wherein the intermediate lip(s) has/have a radial height with respect to the sealing ring base that is substantially the same as the radial height of the further lip before said clamping.

20. A method of manufacturing a tubular element for use in a fluid-conducting duct system, in particular a ventilation duct system, in which an external, circumferential, flexible sealing ring is applied to the outer surface of a tubular body, the tubular element having a wall defining an outer surface, a circumferential groove formed in the outer surface of the wall, and a free end portion disposed at an end of the wall, said sealing ring having a base and a sealing lip extending substantially radially away therefrom, and in which the sealing ring is fastened to the tubular body by bending the free end portion of the tubular body radially outwards and backwards towards the wall of the tubular body, thereby clamping the base of the sealing ring between said bent end portion and said outer surface of the tubular body, the method comprising the steps of:

forming a circumferential groove in the wall of the tubular body, said end portion of the tubular body being first bent to form a radially extending flange;

placing the sealing ring in said groove which matches the sealing ring base, the sealing ring having a further lip which extends substantially radially from said base and which in this position extends adjacent to and substantially in parallel with the radial flange; and bending the flange further back towards the wall of the tubular body so that the further lip is bent down together with the flange and clamped against the sealing ring base.

21. A method of manufacturing a tubular element for use in a fluid-conducting duct system, in particular a ventilation duct system, in which an external, circumferential, flexible sealing ring is applied to the outer surface of a tubular body, the tubular element having a wall defining an outer surface, a circumferential groove formed in the outer surface of the wall, and a free end portion disposed at an end of the wall, said sealing ring having a base and a sealing lip extending substantially radially away therefrom, and in which the sealing ring is fastened to the tubular body by bending the free end portion of the tubular body radially outwards and backwards towards the wall of the tubular body, thereby clamping the base of the sealing ring between said bent end portion and said outer surface of the tubular body, the method comprising the steps of:

forming a circumferential groove in the wall of the tubular body, said end portion of the tubular body being first bent to form a radially extending flange;

axially displacing the sealing ring from an initial position on the tubular body to a position in the groove that matches the sealing ring base, the sealing ring having a further lip which extends substantially radially from said base and which in this position extends adjacent to and substantially in parallel with the radial flange; and bending the flange further back towards the wall of the tubular body so that the further lip is bent down together with the flange and clamped against the sealing ring base.

22. The method of claim 20, wherein an annular, circumferential space is defined by the bent clamping flange and the bottom of the groove, said space being filled with said further lip and a portion of the sealing ring base.

23. The method of claim 22, wherein said space is formed with a radial width which decreases axially inwards from the end of the tubular element.

24. The method of claim 20, wherein sad flange is bent to such an extent that in the clamped position it extends over approximately half of the axial width of the groove.

25. A tubular element assembly for use in a ventilation duct system, comprising an external, circumferential, flexible sealing ring mounted at an end of a tubular element, the tubular element having a wall defining an outer surface, a circumferential groove formed in the outer surface of the wall, and a free end portion disposed at an end of the wall, the sealing ring comprising:

a base which is clamped against the outer surface of the tubular element by means of the free end portion of the tubular element, which is bent radially outwards and turned back towards the outer surface of the tubular element, a main sealing lip extending substantially radially away from said base and adapted to seal against an inner surface of an outer tube, in which the tubular element is inserted, the base of the sealing ring being disposed in the circumferential groove that is formed in the wall of the tubular element, a further lip or projection which is positioned adjacent to the end of the tubular element and which is axially spaced from the main sealing lip, said further lip clamped against said base by means of said free end portion by said bending, and at least one intermediate sealing lip which is disposed between said main sealing lip and said further lip or projection and which extends radially away from the sealing ring base, said intermediate sealing lip being adapted to seal against the inner surface of said outer tube.

26. The tubular element of claim 25, wherein said at least one intermediate sealing lip is radially lower than said main sealing lip with respect to the sealing ring base.

27. The tubular element of claim 25, wherein said at least one intermediate sealing lip has a thickness that is less than that of said main sealing lip.

28. The tubular element of claim 25, wherein said sealing ring has two intermediate sealing lips which are parallel.

29. The tubular element of claim 28, wherein the two intermediate sealing lips have substantially the same radial height with respect to the sealing ring base.

30. The tubular element of claim 25, wherein said intermediate lip has a radial height with respect to the sealing ring base that is substantially the same as the radial height of the further lip or projection before said clamping.

31. The tubular element of claim 25, wherein the further lip or projection is radially lower than the main sealing lip with respect to the sealing ring base before said clamping.

32. The tubular element of claim 25, wherein said groove has an axial width matching the axial width of the base of the sealing ring.

33. The tubular element of claim 25, wherein said further lip or projection extends substantially radially away from the base of the sealing ring before said bending of the end portion of the tubular element.

34. The tubular element of claim 25, wherein said further lip or projection is bent down and clamped against the base of the sealing ring by means of said end portion of the tubular element by said bending.

35. A ventilation system comprising a plurality of tubular elements according to claim 25.

36. A method of manufacturing a tubular element for use in a ventilation duct system, in which an external, circumferential, flexible sealing ring is applied to the outer surface of a tubular body, the tubular element having a wall defining an outer surface, a circumferential groove formed in the outer surface of the wall, and a free end portion disposed at an end of the wall, said sealing ring having a base, a main sealing lip extending substantially radially away from said base, a further lip or projection axially spaced from said main sealing lip, and at least one intermediate sealing lip disposed between the main sealing lip and the further lip or projection and which extends radially away from said base, and in which the sealing ring is fastened to the tubular body by bending the free end portion of the tubular body radially outwards and backwards towards the wall of the tubular body, thereby clamping the base of the sealing ring between said bent end portion and said outer surface of the tubular body, the method comprising the steps of:

forming a circumferential groove in the wall of the tubular body, said end portion of the tubular body being first bent to form a radially extending flange;

placing the sealing ring in said groove; and bending the flange further back towards the wall of the tubular body so that the further lip is bent down together with the flange and clamped against the sealing ring base.

37. A sealing ring to be mounted on an outside surface of a tubular element for use in a fluid-connecting duct system, said sealing ring comprising:

a base comprising a fastening section configured to be clamped by an end portion of the tubular element; and a sealing section having at least one sealing lip adapted to seal against an inner surface of an outer tube in which the tubular element is inserted, wherein the sealing section comprises a main sealing up extending substantially radially away from said sealing ring base, and at least one intermediate sealing lip which is disposed between the main sealing lip and said fastening section and which extends substantially radially away from said sealing ring base, said intermediate sealing lip being adapted to seal against the inner surface of said outer tube.

38. The sealing ring of claim 37, wherein said intermediate sealing lip is radially lower than said main sealing lip with respect to the sealing ring base.

39. The sealing ring of claim 37, wherein said intermediate sealing lip has a thickness that is less than that of said main sealing lip.

40. The sealing ring of claim 37, wherein the sealing has two intermediate sealing lips which are parallel.

41. The sealing ring of claim 40, wherein the two intermediate sealing lips have substantially the same radial height with respect to the sealing ring base.

* * * * *

UNITED STATES PATENT AND TRADEMARK OFFICE
CERTIFICATE OF CORRECTION

PATENT NO. : 6,170,883 B1
DATED : January 9, 2001
INVENTOR(S) : Lars-Ake Mattsson et al.

It is certified that error appears in the above-identified patent and that said Letters Patent is hereby corrected as shown below:

<u>Title page,</u>
Item [30], "(EP) 98850172" should read -- EPO 98850172.2 --;

<u>Column 1,</u>
Line 16, "disclosed" should read -- discloses --;
Line 18, "3-9 and of this" should read -- 3-9 and 3-15 of this --;
Line 35, "bonding" should read -- bending --;

<u>Column 3,</u>
Line 18, "rig" should read -- ring --;

<u>Column 5,</u>
Line 7, "second" should read -- section --;

<u>Column 9,</u>
Line 20, "sad" should read -- said --; and

<u>Column 10,</u>
Line 48, "up" should read -- lip --.

Signed and Sealed this

Ninth Day of July, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,170,883 B1
DATED : January 9, 2001
INVENTOR(S) : Mattsson et al.

It is certified that error appears in the above-identified patent and that said Letters Patent is hereby corrected as shown below:

Title page,
Item [12], inventors name, "Mattssön et al." should read -- Mattsson et al. --;
Item [75], Inventors, "Mattssön" should read -- Mattsson --;

Column 4,
Line 28, "beam" should read -- base --;

Column 7,
Lines 28, 30 and 35, "said further lip" should read -- said further lip or projection --;
Lines 41, 47, 51 and 52, "the further lip" should read -- said further lip or projection --;
Lines 58, 61 and 65, "the further lip" should read -- said further lip or projection --;

Column 8,
Lines 6-7, "the further lip" should read -- said further lip or projection --;
Line 10, "said further lip" should read -- said further lip or projection --;
Line 27, "the further lip" should read -- said further lip or projection --;
Line 46, "a further lip" should read -- a further lip or projection --;
Line 51, "the further lip" should read -- said further lip or projection --;

Column 9,
Line 7, "a further lip" should read -- a further lip or projection --;
Line 11, "the further lip" should read -- said further lip or projection --;
Lines 16-17, "said further lip" should read -- said further lip or projection --;
Line 42, "said further lip" should read -- said further lip or projection --;
Line 64, "the further lip or projection" should read -- said further lip or projection --;
Lines 65-66, "the further lip or projection" should read -- said further lip or projection --;

UNITED STATES PATENT AND TRADEMARK OFFICE
CERTIFICATE OF CORRECTION

PATENT NO. : 6,170,883 B1
DATED : January 9, 2001
INVENTOR(S) : Mattsson et al.

It is certified that error appears in the above-identified patent and that said Letters Patent is hereby corrected as shown below:

Column 10,
Line 36, "the further lip" should read -- said further lip or projection --;
Line 62, "the sealing" should read -- the sealing ring --.

Signed and Sealed this

Eighteenth Day of March, 2003

JAMES E. ROGAN
*Director of the United States Patent and Trademark Office*